US007775609B2

(12) United States Patent
Yamamoto

(10) Patent No.: US 7,775,609 B2
(45) Date of Patent: Aug. 17, 2010

(54) BRAKE CONTROL APPARATUS AND METHOD FOR VEHICLE

(75) Inventor: Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 358 days.

(21) Appl. No.: 11/498,735

(22) Filed: Aug. 4, 2006

(65) Prior Publication Data

US 2007/0057570 A1 Mar. 15, 2007

(30) Foreign Application Priority Data

Sep. 14, 2005 (JP) ............... 2005-267290

(51) Int. Cl.
B60T 8/64 (2006.01)

(52) U.S. Cl. ............... 303/157; 303/113.1; 303/119.1

(58) Field of Classification Search ............... 303/191, 303/155, 156, 157, 158, 113.1, 116.1, 116.2, 303/119.2
See application file for complete search history.

(56) References Cited

U.S. PATENT DOCUMENTS 4,306,527 A * 12/1981 Kinugawa et al. ......... 123/339.1
5,584,543 A * 12/1996 Sawada ..................... 303/191
6,955,408 B1 * 10/2005 Schmitt ..................... 303/191
7,290,841 B2 * 11/2007 Isono ........................ 303/155
2006/0108869 A1 * 5/2006 Jokic et al. ................. 303/191
2006/0158033 A1 * 7/2006 Ohkubo et al. ............. 303/191

FOREIGN PATENT DOCUMENTS

| DE | 41 08 028 A1 | 9/1992 |
|---|---|---|
| DE | 197 25 241 A1 | 12/1998 |
| JP | 8-34330 | 2/1996 |
| JP | 8-58553 | 3/1996 |
| JP | 8-104216 | 4/1996 |
| JP | 8-295225 | 11/1996 |
| JP | 9-175366 | 7/1997 |
| JP | 11-240430 | 9/1999 |
| JP | 2000-16269 | 1/2000 |
| JP | 2001-163198 | 6/2001 |
| JP | 2002-14010 | 1/2002 |
| JP | 2002-79927 | 3/2002 |
| JP | 2003-25977 | 1/2003 |
| JP | 2004-268703 | 9/2004 |
| JP | 2005-247092 | 9/2005 |

* cited by examiner

Primary Examiner—Thomas J Williams
(74) Attorney, Agent, or Firm—Oblon, Spivak, McClelland, Maier & Neustadt, L.L.P.

(57) ABSTRACT

A brake control apparatus for a vehicle includes an actuator and a controller that controls the wheel cylinder pressure to a target hydraulic pressure by driving the actuator in response to a braking request. The controller sets a ceiling value for the rate at which the wheel cylinder pressure is changed in accordance with a temperature, and the wheel cylinder pressure is changed at a rate that is equal to or lower than the ceiling value.

14 Claims, 12 Drawing Sheets

BRAKE CONTROL APPARATUS AND METHOD FOR VEHICLE

INCORPORATION BY REFERENCE

The disclosure of Japanese Patent Application No. 2005-267290 filed on Sep. 14, 2005 including the specification, drawings and abstract is incorporated herein by reference in its entirety.

BACKGROUND OF THE INVENTION

1. Field of the Invention

The invention generally relates to a brake control apparatus and method for controlling the brakes of a vehicle, and more particularly, to a brake control apparatus, and method for controlling the brakes of a vehicle, in which an actuator changes a wheel cylinder pressure.

2. Description of the Related Art

Generally, many vehicles have electronically controlled braking systems as disclosed in JP-A-2001-163198. In such electronically controlled braking systems, the wheel cylinder pressure of each wheel is controlled so that an appropriate braking force is applied to each wheel when the vehicle operator operates a brake pedal. Such electronically controlled braking systems generally have an actuator, such as a linear solenoid valve, that increases or decreases the wheel cylinder pressure. Such an actuator may produce self-excited vibrations caused by, for example, the flow of hydraulic fluid therein. The self-excited vibrations of the actuator may be transmitted to the body of the vehicle through an oil pressure supply/discharge pipe via the hydraulic fluid and make abnormal noise. JP-A-11-240430 discloses, for example, an automatic braking apparatus that includes a pressure-reducing valve controller, which opens a pressure-reducing valve for a predetermined period that covers the time before and after the opening or closing of a pressure-increasing valve when increase of the wheel cylinder pressure begins or end.

Such an actuator may produce self-excited vibrations when the pressure change rate for changing the wheel cylinder pressure, the amount of change in pressure, or the volume of fluid flowing through the linear solenoid valve is large. The references discussed above do not describe how to reduce such self-excited vibrations.

SUMMARY OF THE INVENTION

It is an object of the present invention to effectively suppress the occurrence of self-excited vibrations caused by sudden changes in wheel cylinder pressure when the rate of change in hydraulic pressure is high, in the actuators that change the hydraulic pressure in wheel cylinders.

In a first aspect of the invention, the brake control apparatus for a vehicle includes an actuator that changes a wheel cylinder pressure and a controller that controls the wheel cylinder pressure to a target hydraulic pressure by driving the actuator in response to a braking request. The controller sets a ceiling value of the pressure change rate, which indicates the change in the wheel cylinder pressure per unit time, in accordance with a temperature, and changes the wheel cylinder pressure at a rate that is equal to or lower than the ceiling value.

In another aspect of the present invention, a brake control method is provided, in which a temperature is determined. A ceiling value of a pressure change rate, which indicates a change in the wheel cylinder pressure per unit time, is set in accordance with the determined temperature. The rate at which the wheel cylinder pressure is changed is maintained equal to or lower than the ceiling value.

According to the aspects of the present invention, because the pressure change rate of the wheel cylinder pressure is limited to the ceiling value, the occurrence of self-excited vibration in the actuator caused by a high pressure change rate is suppressed. However, the pressure change rate at which the self-excited vibration tends to occur in the actuator varies depending with the temperature. According to the aspect of the present invention, because the ceiling value of the pressure change rate of the wheel cylinder pressure can be changed in accordance with the temperature, the occurrence of the self-excited vibration in the actuator is effectively suppressed.

The ceiling value may be increased as the temperature decreases. Generally, the occurrence of self-excited vibration decreases when the vehicle is in a lower temperature, as compared with when the vehicle is in a higher temperature, even if the wheel cylinder pressure is changed at a high pressure change rate. According to the aspect of the present invention, in a lower temperature in which the self-excited vibration does not tend to occur, the restriction on the pressure change rate can be reduced to allow more rapid changes in the wheel cylinder pressure.

The wheel cylinder pressure may be decreased at a pressure change rate equal to or less than the set ceiling value. A vehicle operator tends to suddenly release a brake upon starting the vehicle. In other words, it seems that there are many opportunities in which the wheel cylinder pressure is reduced at a high reduction rate. According to this aspect of the present invention, the occurrence of self-excited vibrations in the actuator can be suppressed during the reduction of the wheel cylinder pressure.

The wheel cylinder pressure may be changed at the pressure change rate equal to or lower than the set ceiling value, while the vehicle stops. A vehicle operator tends to suddenly release a brake upon starting the vehicle. While the vehicle stops, due to low ambient noise of the vehicle, the vehicle operator is more likely to hear abnormal noise of the vehicle, caused by the self-excited vibrations produced in the pressure-reducing actuator. According to this aspect of the present invention, while the vehicle stops, the occurrence of self-excited vibrations in the actuator can be suppressed during the reduction of the wheel cylinder pressure. Accordingly, the occurrence of abnormal noise caused by the self-excited vibrations can be suppressed, and thus the vehicle operator is prevented from hearing such abnormal noise.

The temperature may be determined in accordance with a temperature of a coolant that cools an engine of the vehicle. According to this aspect of the present invention, the temperature can be easily determined by use of a detection result of vehicle's coolant temperature. Thus, the occurrence of self-excited vibrations in the actuator can be suppressed in a simple manner.

The temperature may be determined in accordance with an ambient temperature in a vicinity of an engine of the vehicle. According to this aspect of the present invention, the temperature can be easily determined by use of a detection result of the ambient temperature in the vicinity of the engine. Thus, the occurrence of self-excited vibrations in the actuator can be suppressed in a simple manner.

The temperature may be determined in accordance with an idling engine speed. Generally, the idling engine speed changes depending upon the temperature. According to the aspect of the present invention, the temperature can be easily determined by use of the idling engine speed of the vehicle, which is controlled based on the temperature. Thus, the occurrence of self-excited vibrations in the actuator can be suppressed in a simple manner.

According to the brake control apparatus or brake control method for a vehicle of the present invention, in an actuator that changes a hydraulic pressure in a wheel cylinder, an occurrence of a self-excited vibration caused by a sudden change in a wheel cylinder pressure at a high pressure change rate is effectively suppressed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
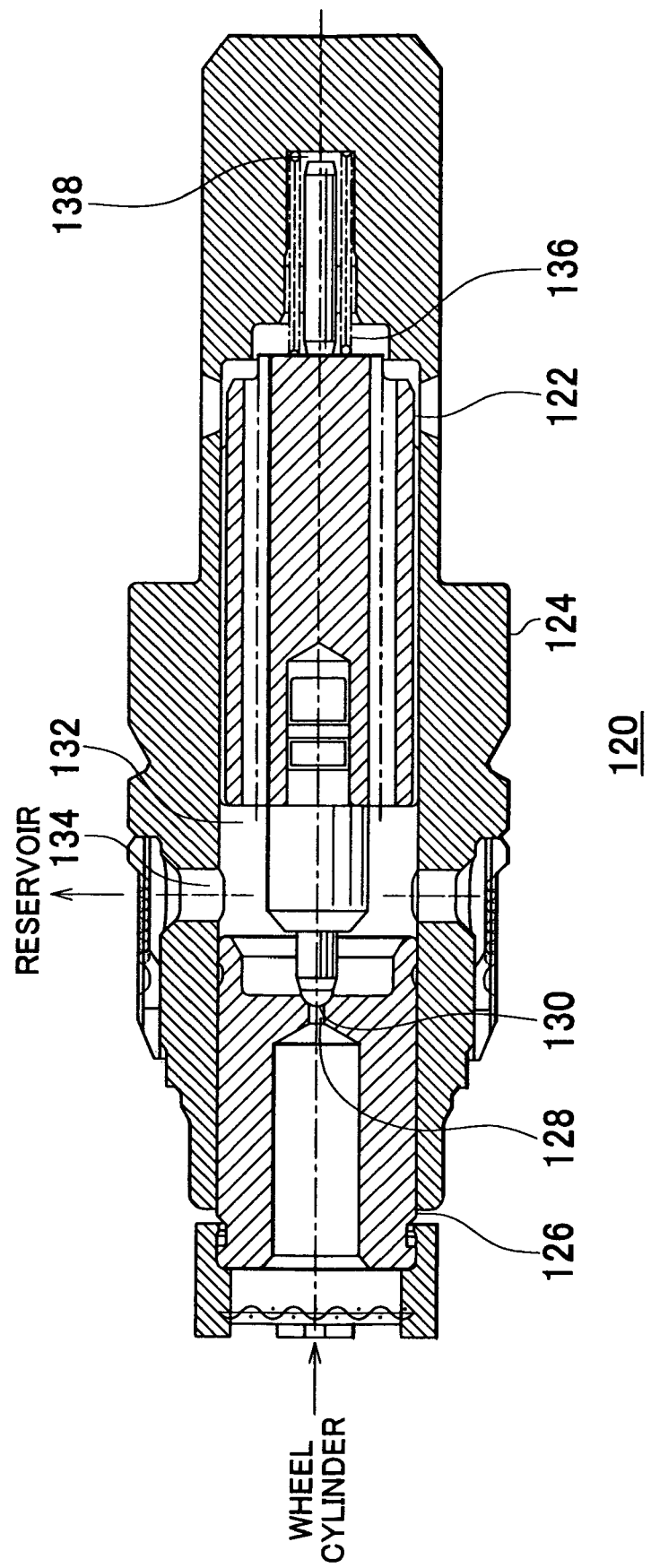
FIG. 1 is a view illustrating an example of a pressure-reducing linear valve.

FIG. 1 is a view illustrating an example of a pressure-reducing linear valve. The pressure-reducing linear valve 120 functions as an actuator that reduces the wheel cylinder pressure. The pressure-reducing linear valve 120 includes valve housing 124, plunger 122, intake path forming member 126, spring 136, or the like. Pressure-reducing linear valve 120 is a so-called normally closed linear valve, which remains closed unless acted upon.

Valve housing 124 has a substantially cylindrical shape with an interior cylinder chamber 132 and a closed base. A cylindrical spring chamber 138 is formed in the closed base of cylinder chamber 132.

Spring 136 is inserted into spring chamber 138, and one end of spring 136 is attached to the base portion of spring chamber 138. Plunger 122, formed in a substantially cylindrical shape, is inserted into cylinder chamber 132, and contacts the other end of spring 136. The outer diameter of plunger 122 is formed slightly smaller than the inner diameter of cylinder chamber 132. Plunger 122 is inserted in cylinder chamber 132 so as to be slidable in the inserting direction. A hemispherical ball portion 130 is provided at an end of plunger 122 facing the open side of the cylinder chamber 132.

Intake path forming member 126 is also inserted in cylinder chamber 132 from the open end of cylinder chamber 132. A discharge path 134 is formed at the portion of the valve housing 124 between plunger 122 and intake path forming member 126 and extends from the inner peripheral surface of cylinder chamber 132 to the outer peripheral surface of valve housing 124. Discharge path 134 is communicatively connected with a reservoir tank via an oil pressure supply/discharge pipe.

Intake path forming member 126 encloses an intake path 128 that extends from the open end of cylinder chamber 132 to interior of the cylinder chamber 132. The end of the intake path 128 at the open end of the cylinder chamber 132 is communicatively connected to a wheel cylinder via an oil pressure supply/discharge pipe. When pressure-reducing linear valve 120 is not acted upon, the plunger 122 is pressed toward the open end of the cylinder chamber 132 by spring 136 so that ball portion 130 is seated on intake path 128 disposed in the interior of cylinder chamber 132.

Intake path 128, cylinder chamber 132 and discharge path 134 are filled with brake oil as a hydraulic fluid. A coil (not shown) is wound around to the outside of pressure-reducing linear valve 120. When an electric current is supplied to the coil, ball portion 130 is separated from intake path 128, and pressure-reducing linear valve 120 thus opens so that the hydraulic fluid in the wheel cylinder flows into the reservoir tank. The electric current supplied to the coil is controlled by the duty cycle control so as to adjust the opening action of pressure-reducing linear valve 120. Thus, by controlling the opening action of the pressure-reducing linear valve 120, the pressure change rate in reducing the wheel cylinder pressure can be controlled.

Generally, intake path 128, cylinder chamber 132 and discharge path 134 are filled with hydraulic fluid by vacuum filling in order to prevent air from coming in the fluid path. Nevertheless, a slight amount of air may remain in the back (end) portion of cylinder chamber 132, such as in spring chamber 138, even if the hydraulic fluid is filled by the, method like vacuum filling. The air remaining in spring chamber 138 makes spring 136 resonant. Accordingly, when air remains in spring chamber 138, self-excited vibrations of plunger 122 tend to occur upon the operation of pressure-reducing linear valve 120. The self-excited vibrations occurring in pressure-reducing linear valve 120 are transmitted to the body of the vehicle through the oil pressure supply/discharge pipe via the hydraulic fluid, and make abnormal sounds.

Figure 2:
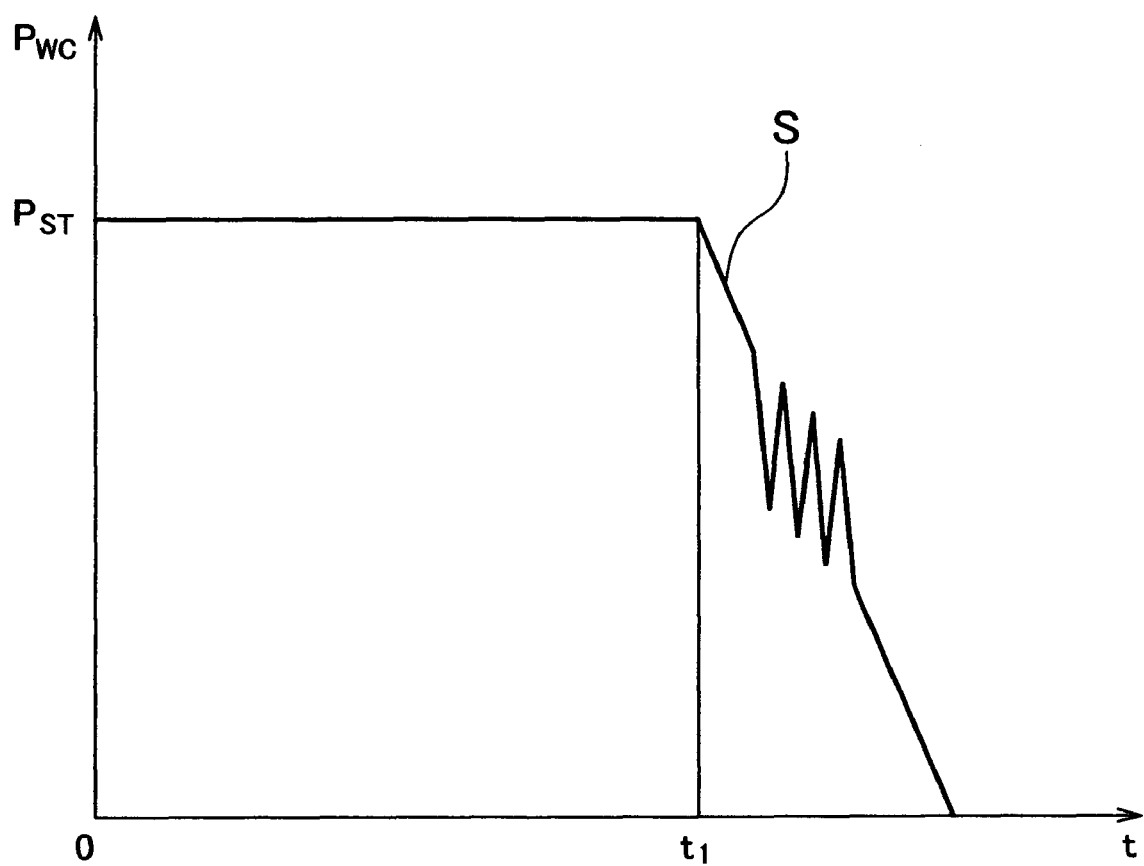
FIG. 2 is a view explaining an example of the change in a wheel cylinder pressure over time when self-excited vibrations occur in the pressure-reducing linear valve.

FIG. 2 is a view explaining an example of the change in wheel cylinder pressure Pwc over time, when self-excited vibrations occur in the pressure-reducing linear valve. In FIG. 2, the vertical and horizontal axes respectively represent wheel cylinder pressure Pwc and time t.

In FIG. 2, a braking operation starts at the time zero when a vehicle operator steps on the brake pedal, and the brakes are rapidly released at time t1. Thus, hydraulic pressures are applied to the wheel cylinder during the period from zero to time t1. At time t1, the pressure-reducing linear valve is operated, and the wheel cylinder pressure Pwc is reduced at a high pressure change (reduction) rate from initial wheel cylinder pressure PST. When the initial wheel cylinder pressure PST is high, or the amount of reduction in the wheel cylinder pressure is large, self-excited vibrations tend to occur, due to the large volume of hydraulic fluid flowing in the pressure-reducing linear valve.

When the pressure change rate, which is the rate of the change in hydraulic pressure in wheel cylinder pressure per unit time from time t1, is high, self-excited vibrations tend to occur in the pressure-reducing linear valve, due to the large volume of hydraulic fluid flowing in the pressure-reducing linear valve per unit time. For example, in pressure-reducing linear valve 120, when the wheel cylinder pressure Pwc is suddenly reduced at a high pressure change rate starting from, for example, 10 Mpa as the initial wheel cylinder pressure PST, it has been empirically shown that self-excited vibrations having an amplitude between 0.5 Mpa and 1.0 Mpa and a frequency between 400 Hz and 600 Hz sometimes occur. In the following description, the pressure change rate represents the absolute value of the change in the wheel cylinder pressure per unit time.

As described above, when air remains in the linear valve, or the wheel cylinder pressure to be changed is large, or the rate of the change in wheel cylinder pressure is large, self-excited vibrations may occur in the linear valve. The self-excited vibrations in the actuator (i.e. linear valve) are transmitted to the body of the vehicle through the oil pressure supply/discharge pipe and may make abnormal sounds.

In particular, when a vehicle begins to move from a standstill, the vehicle operator releases the brakes from a strongly braking condition. While the vehicle is stopped, the vehicle operator is likely to hear any abnormal noises caused by self-excited vibrations produced in the pressure-reducing linear valve due to low ambient noise of the vehicle. Accordingly, especially while the vehicle is stopped, the occurrence of self-excited vibrations in the pressure-reducing linear valve must be suppressed so that the vehicle operator is not disturbed by the abnormal noise.

Figure 3:
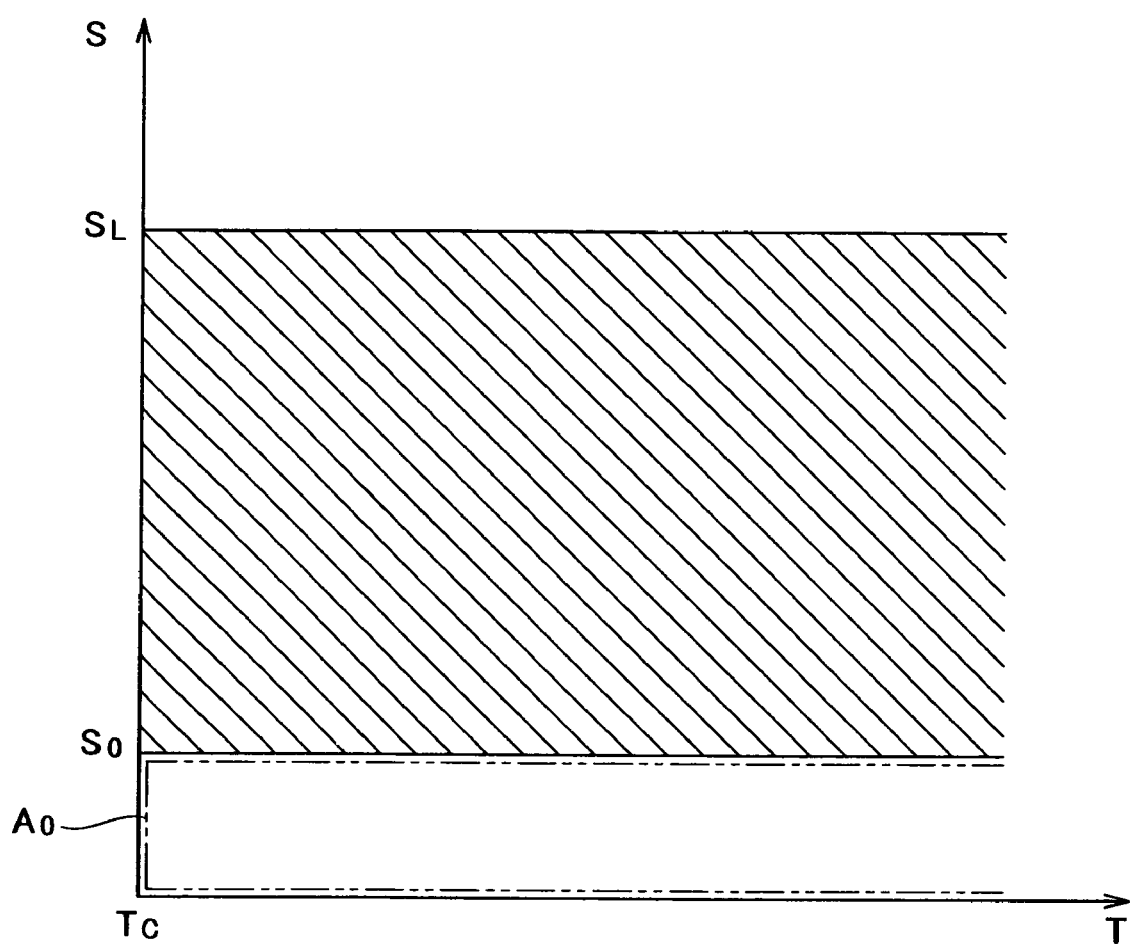
FIG. 3 is a view explaining an example of a relationship between a temperature of a hydraulic fluid in the pressure-reducing linear valve and a pressure change (reduction) rate of the wheel cylinder pressure and the pressure change (reduction) rate for reducing the wheel cylinder pressure is limited to a ceiling value.

FIG. 3 is a view explaining an example of a relationship between the temperature T of the hydraulic fluid in the pressure-reducing linear valve and the pressure change rate S of the wheel cylinder pressure, when the pressure change rate for reducing the wheel cylinder pressure is limited to a ceiling value. In FIG. 3, Tc represents an extreme low temperature, such as a minus thirty degrees (−30° C.), which is considered to be the lowest temperature at which the vehicle may be operated.

As described above, when the pressure change rate for reducing the wheel cylinder pressure is large, self-excited vibrations may occur in the linear valve. Accordingly, the pressure change rate may be limited to the ceiling value during the reduction of cylinder pressure.

FIG. 3 shows an example in which the ceiling value of the pressure change rate for reducing the wheel cylinder pressure of the vehicle is set to constant S0, regardless of the temperature T of the hydraulic fluid in the pressure-reducing linear valve. In FIG. 3, SL represents the pressure change rate when the pressure-reducing linear valve is maximally opened. When the pressure-reducing linear valve is maximally opened, self-excited vibrations do not occur even if the pressure change rate is high. In the example shown in FIG. 3, when the wheel cylinder pressure is reduced while the pressure-reducing linear valve 120 is not maximally opened, the pressure change rate for reducing the wheel cylinder pressure is limited within the range A0, which is equal to and higher than zero and is equal to and lower than S0. When the wheel cylinder pressure is reduced while the pressure-reducing linear valve 120 is maximally opened, because self-excited vibrations do not occur, the ceiling value of the pressure change rate is not established. Thus, self-excited vibrations occur in the hatched range, which is larger than S0 and smaller than SL, and the wheel cylinder pressure is prevented from decreasing at the pressure change rate in this range.

Accordingly, the occurrence of self-excited vibrations is suppressed by preventing the wheel cylinder pressure from decreasing at a high pressure change rate. In addition, since the pressure change rate for reducing the wheel cylinder pressure is limited to the ceiling value, the occurrence of the self-excited vibrations caused by the air remaining in the pressure-reducing linear valve 120 and the occurrence of the self-excited vibrations caused by the high initial wheel cylinder pressure PST can also be suppressed.

The pressure change rate at which self-excited vibrations begin to occur in the linear valves varies depending upon the temperature. In more detail, when the vehicle is in a low temperature, self-excited vibrations do not easily occur even if the wheel cylinder pressure is changed at a high pressure change rate because of the high viscosity of the hydraulic fluid flowing in the linear valve. Accordingly, when the vehicle is in the low temperature, self-excited vibrations can be suppressed, even if the restriction of the pressure change rate is reduced.

Figure 4:
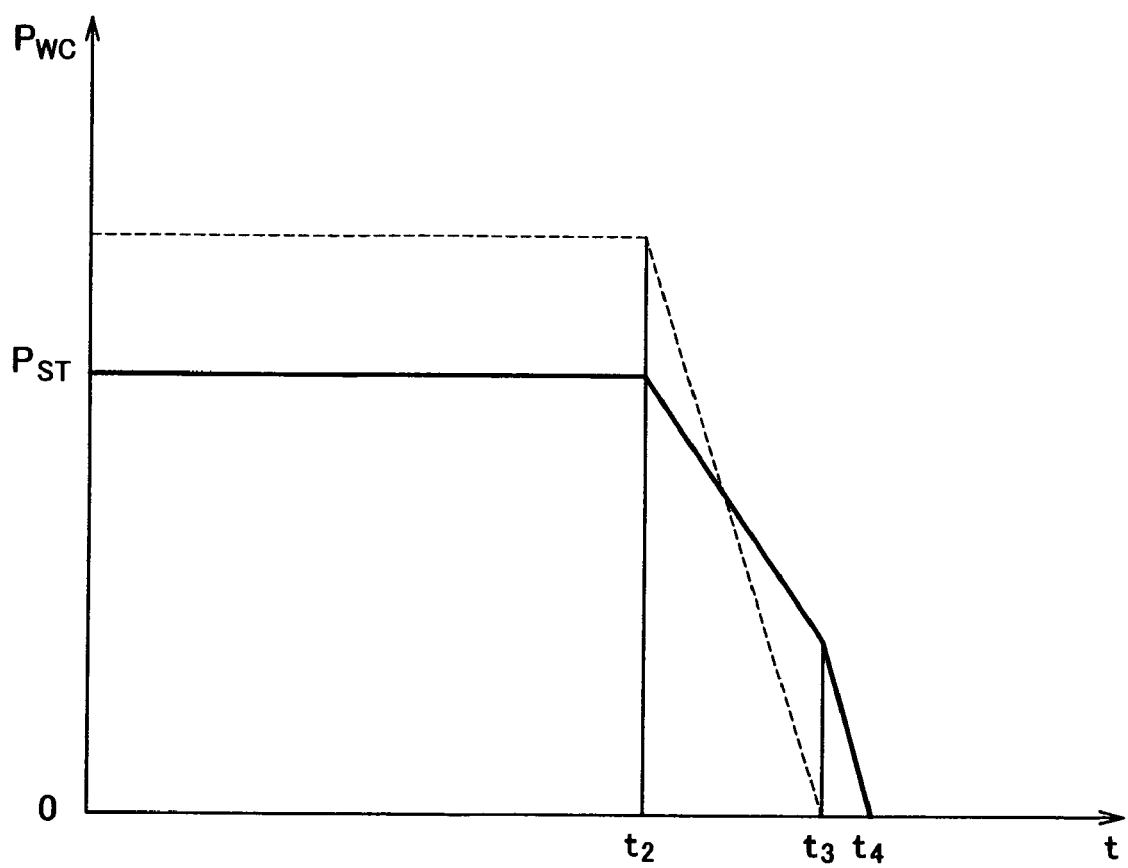
FIG. 4 is a view explaining an example of a change in the wheel cylinder pressure over time when the brake is released, when the wheel cylinder pressure is limited to the ceiling value.

FIG. 4 is a view illustrating an example of changes in the wheel cylinder pressure Pwc over time when the brake is released and the pressure change rate for reducing the wheel cylinder pressure is limited to a ceiling value. The broken line represents the amount of operation of the brake pedal.

In the graph according to FIG. 4, the brake pedal remains depressed until time t2 and is rapidly released between the time t2 and time t3. When the ceiling value of the pressure change (reduction) rate for reducing the wheel cylinder pressure is set to 3 Mpa/second, for example, the wheel cylinder pressure is controlled so that it is reduced at a pressure reduction rate that is equal to or lower than the ceiling value. Therefore, when the brake is rapidly released as shown in FIG. 4, the wheel cylinder pressure is sometimes not reduced to zero even after time t3, which is the time when the vehicle operator completely releases the brake pedal. When the vehicle operator completely releases the brake pedal, the brake control is terminated and the pressure-reducing linear valve is maximally opened. Accordingly, the wheel cylinder pressure is then reduced according to an increased pressure change rate after time t3 and the wheel cylinder pressure Pwc reaches zero at time t4.

As described above, if the wheel cylinder pressure Pwc cannot be reduced to zero by the time the brake is completely released, the vehicle operator may sense that the braking force has not been released even though the brake pedal has been released. The lag in response to the release of the brake pedal may be discomforting to the vehicle operator.

In this example, after time t3, at which a reduced wheel cylinder pressure Pwc (breaking force) is applied to the wheels, the wheel cylinder pressure Pwc is reduced at the increased rate for reducing the wheel cylinder pressure Pwc and the braking force applied to the wheels is rapidly reduced and released. If the vehicle has an automatic transmission, a creeping force is applied to the vehicle by engine idling, even if the vehicle is stopped. Accordingly, when the braking force is rapidly released from the condition in which a reduced braking force is applied to the wheels, the vehicle operator feels like the vehicle jerks forward. The vehicle operator may feel uncomfortable therewith.

Because the viscosity of the hydraulic fluid of the automatic transmission is low when the vehicle is in a high temperature, the engine torque is not easily transmitted to the wheels and thus the creeping force applied to the vehicle is small. In addition, because the engine speed during idling is low, the creeping force applied to the vehicle is small. Accordingly, the vehicle operator is less likely to notice a lag in response to the release of the brakes or the vehicle jerking forward.

On the other hand, when the vehicle is in a low temperature, because the viscosity of the hydraulic fluid of the automatic transmission is high, the engine torque is easily transmitted to the wheels and thus the creeping force applied the vehicle is large. In addition, because the engine speed during idling is high, the creeping force applied to the vehicle is large. The vehicle operator is more likely to notice a lag in response to the release of the brakes or the vehicle jerking forward. According to the present invention, such uncomfortable feelings are suppressed, because the restriction on the rate at which the wheel cylinder pressure is changed is reduced, especially when the vehicle is in the low temperature.

Exemplary embodiments of the present invention will be described in detail with reference to the drawings.

Figure 5:
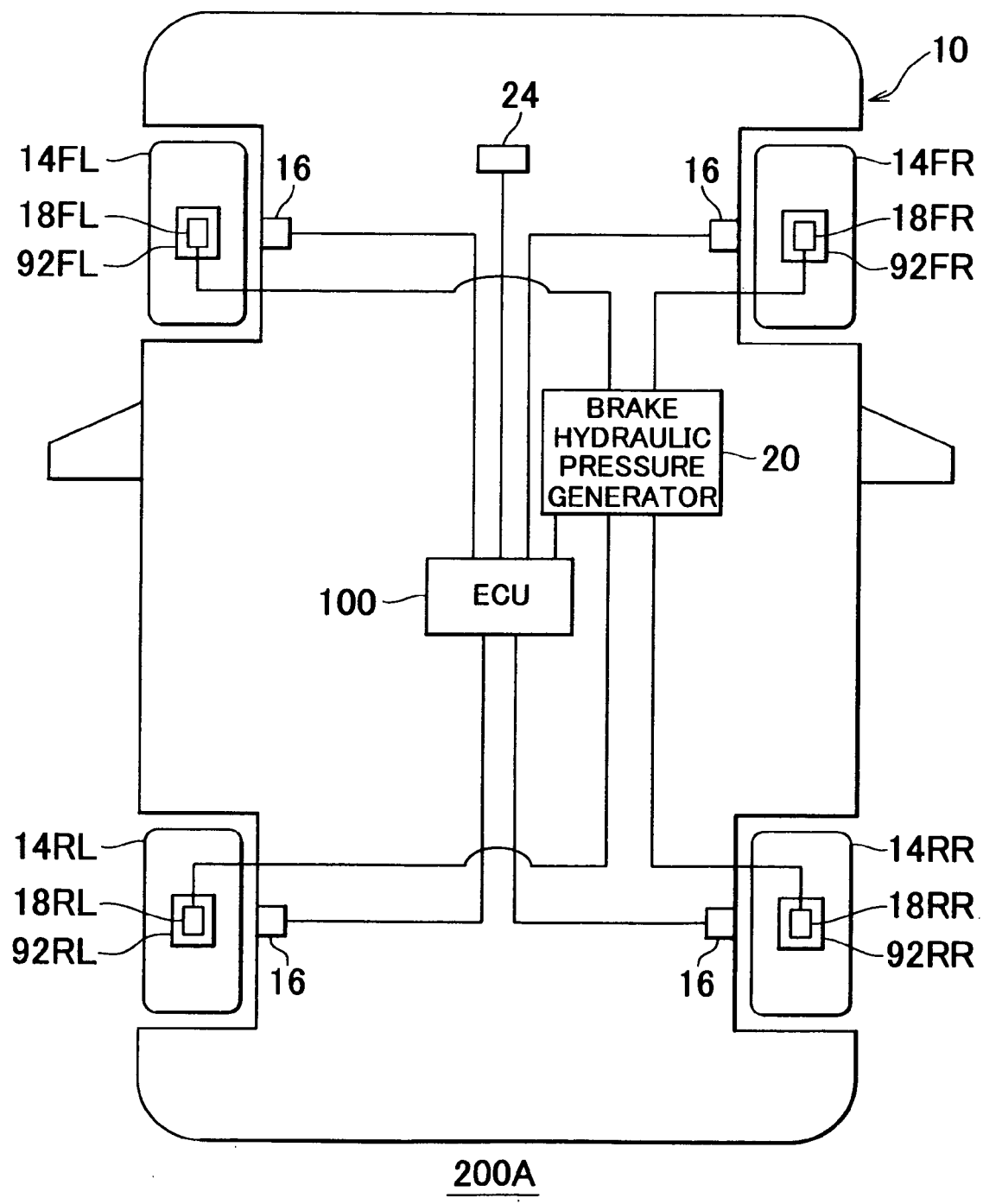
FIG. 5 is a schematic view illustrating an entire configuration of a brake control apparatus for a vehicle according to a first embodiment of the present invention.

FIG. 5 is a schematic view illustrating an entire configuration of a brake control apparatus 200A for a vehicle according to a first embodiment of the present invention. Brake control apparatus 200A for a vehicle has an electronic control unit (ECU) 100, and a hydraulic brake system, which is described later, on a vehicle 10. ECU 100 of the embodiment functions as a brake ECU that controls the hydraulic brake system. The vehicle 10 of the embodiment equipped with an automatic transmission (not shown).

The hydraulic brake system includes front right wheel brake 92FR, front left wheel brake 92FL, rear right wheel brake 92RR and rear left wheel brake 92RL (hereinafter, collectively referred to as brakes 92). The hydraulic brake system further includes brake hydraulic pressure generator 20, a brake pedal 52, stroke sensor 40, or the like.

Front right wheel brake 92FR, front left wheel brake 92FL, rear right wheel brake 92RR and rear left wheel brake 92RL are provided in association with front right wheel 14FR, front left wheel 14FL, rear right wheel 14RR and rear left wheel 14RL, respectively. Front right wheel brake 92FR, front left wheel brake 92FL, rear right wheel brake 92RR and rear left wheel brake 92RL are respectively provided with front right wheel cylinder 18FR, front left wheel cylinder 18FL, rear right wheel cylinder 18RR and rear left wheel cylinder 18RL (hereinafter, collectively referred to as wheel cylinders 18). Wheel cylinders 18 are connected to the brake hydraulic pressure generator 20. The brake hydraulic pressure generator 20 increases or decreases the hydraulic pressure at each wheel cylinder 18.

When the wheel cylinder pressure is increased, a caliper presses a friction member, such as a brake pad, against a disc rotor, which rotates with wheel 14, according to the wheel cylinder pressure. The braking force is thus applied to or increased at the wheels 14. In the meantime, when the wheel cylinder pressure decreases, the force of the brake pad pressing the disc rotor is released or reduced, and thus the braking force is released or reduced.

In the first embodiment, the disc brakes are used as four brakes 92; however, drum brakes may be provided for four wheels or two rear wheels, instead. In the case where drum brakes are provided, when the wheel cylinder pressure increases, a friction member, such as the lining of a brake shoe, is pressed against the interior of a drum that rotates with wheel 14, according to the wheel cylinder pressure. Braking force is thus applied to or increased at the wheel 14. When the wheel cylinder pressure decreases, a shoe spring retracts the lining with brake shoe, and thus the braking force applied to the wheel 14 is released or reduced.

Brake control apparatus 200A for a vehicle further includes sensors, such as wheel speed sensors 16, coolant temperature sensor 24, or the like. Wheel speed sensors 16 are respectively provided in the vicinity of each of the four wheels. Wheel speed sensors 16 are rotation sensors, such as electromagnetic pick-up sensors or hall effect IC sensors, to detect the rotation of each of the four wheels. Each wheel speed sensor 16 is connected with ECU 100, and the result detected by wheel speed sensors 16 is input to ECU 100.

Coolant temperature sensor 24 detects the temperature of the coolant that cools the engine. The temperature of the coolant is low when the engine is not operating or immediately after the engine is started, and increases after the engine is operated for a while. Because the temperature in or around the engine compartment may change substantially synchronous with the coolant temperature, the temperature at which the vehicle is operated, such as the temperature in or around the engine compartment or the temperature of hydraulic fluid in the pressure-reducing linear valve, can be determined according to the detected result of the coolant temperature. Accordingly, the coolant temperature sensor 24 functions as a temperature detector. Coolant temperature sensor 24 is connected with ECU 100 and the result detected by coolant temperature sensor 24 is input to ECU 100.

Figure 6:
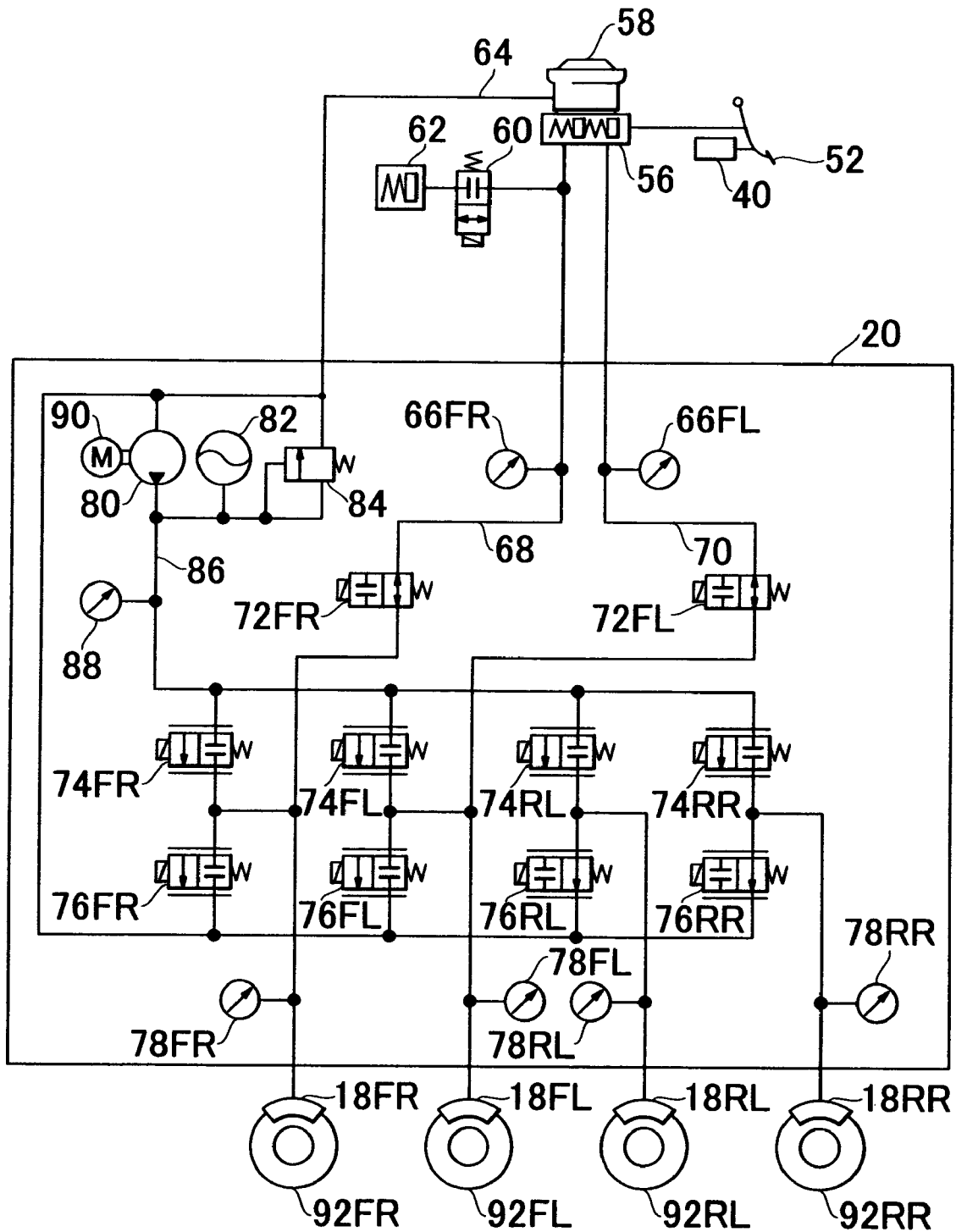
FIG. 6 is a view illustrating an entire configuration of a hydraulic brake system according to the first embodiment of the present invention.

FIG. 6 is a schematic view of an entire configuration of hydraulic brake system 150 according to the first embodiment of the present invention. Hydraulic brake system 150 includes the brake hydraulic pressure generator 20, the master cylinder 56 and the brakes 92. In the first embodiment, the hydraulic brake system 150 is an electronically controlled braking system. The electronically controlled braking system controls wheel cylinder pressures based upon the amount of operation of brake pedal 52, the speed of each wheel 14, and so on, and gives an appropriate braking force to each wheel 14.

Brake pedal 52 is provided with a stroke sensor 40 that detects the amount of depression of the brake pedal 52. In other words, stroke sensor 40 functions as a brake operation detector that detects whether the brake pedal 52 is operated, or the brake is actuated.

Master cylinder 56 is connected to an end of a front right brake oil pressure control pipe 68 and to an end of a front left brake oil pressure control pipe 70. These brake oil pressure control pipes are connected with front right wheel cylinder 18FR and front left wheel cylinder 18FL, respectively. Therefore, master cylinder 56 and front right wheel cylinder 18FR are communicatively connected with each other via brake oil pressure control pipe 68. Master cylinder 56 and front left wheel cylinder 18FL are communicatively connected with each other via brake oil pressure control pipe 70. Brake oil pressure control pipes 68 and 70 thus function as master cylinder communication paths that communicatively connect master cylinder 56 with front wheel cylinders. Master cylinder 56 feeds brake oil, as a hydraulic fluid, by pressure, to brake oil pressure control pipe 68 and brake oil pressure control pipe 70 according to the depression of the brake pedal 52.

The right master diverter valve 72FR is provided for the brake oil pressure control pipe 68. The right master diverter valve 72FR is a normally-opened electromagnetic valve, which stays open normally, and shuts off the communication between master cylinder 56 and front right wheel cylinder 18FR and cancel the shut-off. The left master diverter valve 72FL is provided for the brake oil pressure control pipe 70. The right master diverter valve 72FL is a normally-opened electromagnetic valve and shuts off the communication between master cylinder 56 and front left wheel cylinder 18FL and cancels the shut-off. (Right master diverter valve 72FR and left master diverter valve 72FL are collectively referred to as "master diverter valves 72", hereinafter). Master diverter valves 72 open and close according to the supplied electric current, and thus shut off the communication between master cylinders 56 and wheel cylinders 18 and cancel the shut-off.

The brake oil pressure control pipe 68 is provided with the right master cylinder pressure sensor 66FR, and the brake oil control pipe 70 is provided with the left master cylinder pressure sensor 66FL. (Right master cylinder pressure sensor 66FR and left master cylinder pressure sensor 66FL are collectively referred to as master cylinder pressure sensors 66, hereinafter). The right master cylinder pressure sensor 66FR and left master cylinder pressure sensor 66FL detect a master cylinder pressure, which is the hydraulic pressure at master cylinder 56. Right master cylinder pressure sensor 66FR and left master cylinder pressure sensor 66FL are connected with ECU 100 and the results detected thereby are input to ECU 100.

Master cylinder 56 is connected with reservoir tank 58. Master cylinder 56 is further connected with wet stroke simulator 62 via check valve 60. Reservoir tank 58 is connected with an end of oil pressure supply/discharge pipe 64. Oil pressure supply/discharge pipe 64 is provided with a pump 80, and the discharge side of the pump 80 is connected with high-pressure pipe 86. Pump 80 is driven by pump motor 90 as an electric actuator. High-pressure pipe 86 is provided with accumulator 82. Accumulator 82 accumulates high hydraulic fluid pressures (e.g. 16-21.5 Mpa) increased by pump motor 90. High-pressure pipe 86 is connected with relief valve 84. When an accumulator pressure, as a hydraulic fluid pressure of accumulator 82 reaches a high pressure, such as 30 Mpa, relief valve 84 opens and the high-pressure hydraulic fluid is discharged to oil pressure supply/discharge valve 64.

High-pressure pipe 86 is provided with an accumulator pressure sensor 88 that detects the accumulator pressure. Accumulator pressure sensor 88 is connected with ECU 100, and the result detected by accumulator pressure sensor 88 is input to ECU 100.

High-pressure pipe 86 is connected with front right pressure-increasing linear valve 74FR, front left pressure-increasing linear valve 74FL, rear right pressure-increasing linear valve 74RR and rear left pressure-increasing linear valve 74RL, which are collectively referred to as pressure-increasing linear valves 74, hereinafter. Front right pressure-increasing linear valve 74FR, front left pressure-increasing linear valve 74FL, rear right pressure-increasing linear valve 74RR and rear left pressure-increasing linear valve 74RL are respectively connected with front right wheel cylinder 18FR, front left wheel cylinder 18FL, rear right wheel cylinder 18RR, and rear left wheel cylinder 18RL. Accordingly, accumulator 82 is connected with the four wheel cylinders 18 of the four wheels 14 via pressure-increasing linear valves 74.

Pressure-increasing linear valves 74 are normally-closed electromagnetic valves, and shut off the communication between accumulator 82 and wheel cylinder 18 and cancel the shut-off in response to the driving command from ECU 100. When the pressure-increasing linear valves 74 open, the hydraulic fluid pressure accumulated in accumulator 82 is supplied to wheel cylinders 18, and thus the wheel cylinder pressures are increased. Therefore, the pressure-increasing linear valves 74 function as actuators that increase the wheel cylinder pressure.

The front right wheel cylinder 18FR, front left wheel cylinder 18FL, rear right wheel cylinder 18RR, and rear left wheel cylinder 18RL are respectively connected to an oil pressure supply/discharge pipe 64 via front right pressure-reducing linear valve 76FR, front left pressure-reducing linear valve 76FL, rear right pressure-reducing linear valve 76RR and rear left pressure-reducing linear valve 76RL, which are collectively referred to as pressure-reducing linear valves 76 hereinafter. The oil pressure supply/discharge pipe 64 is connected with reservoir tank 58. Accordingly, the wheel cylinders 18 are connected with reservoir tank 58 via pressure-reducing linear valves 76.

Front right pressure-reducing linear valve 76FR and front left pressure-reducing linear valve 76FL are normally-closed electromagnetic valves, and rear right pressure-reducing linear valve 76RR and rear left pressure-reducing linear valve 76RL are normally-opened electromagnetic valves. Linear valves same as those used for pressure-reducing linear valves 120 shown in FIG. 1 can be used for front right pressure-reducing linear valve 76FR and front left pressure-reducing linear valve 76FL. Pressure-reducing linear valves 76 shut off the communication between reservoir tank 58 and wheel cylinders 18, and cancel the shut-off in response to the driving command from ECU 100. When pressure-reducing linear valves 76 open, the hydraulic fluids in wheel cylinders 18 are discharged to reservoir tank 58, and the wheel cylinder pressures decreases. Pressure-reducing linear valves 76 thus function as actuators that reduce the wheel cylinder pressures.

Front right wheel cylinder pressure sensor 78FR, front left wheel cylinder pressure sensor 78FL, rear right wheel cylinder pressure sensor 78 RR and rear left wheel cylinder pressure sensor 78RL, which are hereinafter collectively referred to as wheel cylinder pressure sensors 78, are respectively provided in the vicinity of each of the four wheel cylinders 18. Wheel cylinder pressure sensors 78 detect the respective wheel cylinder pressure of each wheel cylinder 18. Wheel cylinder pressure sensors 78 are connected with ECU 100 and the results detected by wheel cylinder pressure sensors 78 are input to ECU 100.

Figure 7:
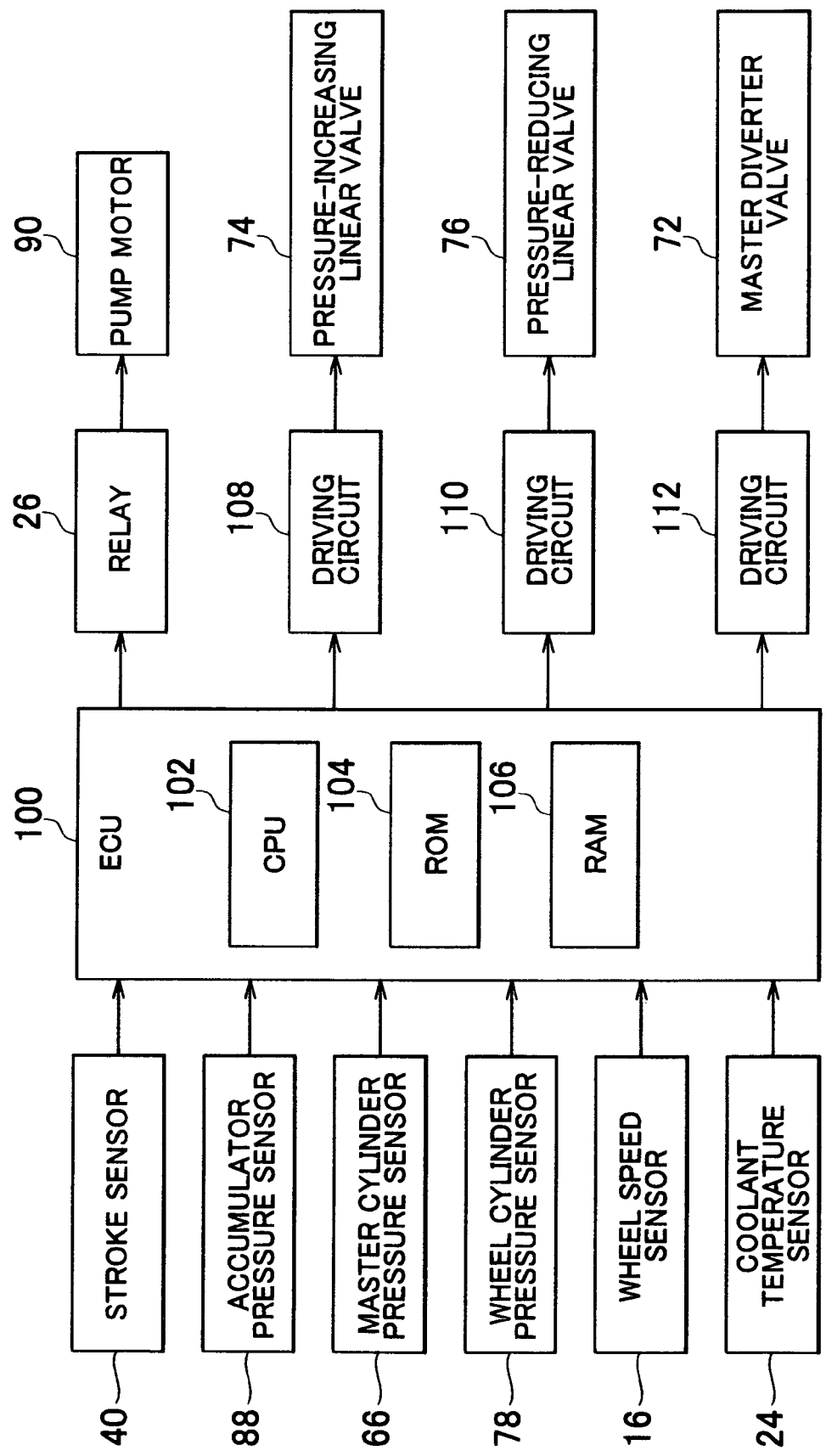
FIG. 7 is a block diagram illustrating an ECU in the brake control apparatus of the vehicle according to the first embodiment of the present invention.

FIG. 7 is a functional block diagram illustrating ECU 100 in the brake control apparatus 200A of a vehicle according to the first embodiment of the present invention. ECU 100 includes a central processing unit (CPU) 102 having a micro computer, ROM 104, RAM 106, and so on.

Pressure-increasing linear valves 74, pressure-reducing linear valves 76 and master diverter valves 72 are connected with ECU 100 via driving circuit 108, driving circuit 110 and driving circuit 112, respectively. ECU 100 inputs control currents to the driving circuit 108, driving circuit 110 and driving circuit 112. The driving circuit 108, driving circuit 110 and driving circuit 112 are connected to a battery (not shown), and supply an electric current to pressure-increasing linear valves 74, pressure-reducing linear valves 76 and master diverter valves 72 according to the duty corresponding to the input control electric current. Pressure-increasing linear valves 74, pressure-reducing linear valves 76 and mater diverter valves 72 are opened and closed according to the supplied electric currents, increase or decrease the wheel cylinder pressures, and communicatively connect wheel cylinders 18 with master cylinder 56.

Pump motor 90 is connected with ECU 100 via relay 26. ECU 100 controls ON and OFF of relay 26. Relay 26 is connected with a battery (not shown). When the relay 26 is switched on, electric power is supplied from the battery to pump motor 90 to drive pump motor 90.

ROM 104 includes plural pieces of data and plural programs, such as a program that sets the ceiling value of the pressure change rate (rate of change in pressure) in accordance with the temperature and a program that changes wheel cylinder pressures at a rate that is equal to or smaller than the set (established) ceiling value. RAM 106 is used as a work area for storing data or executing programs. The CPU 102 performs many kinds of calculations using the programs stored in ROM 104, data stored in RAM 106, and so on.

The CPU 102 calculates the amount the brake pedal 52 is depressed based on the results detected by the stroke sensor 40 and the corresponding force of depression based on the results detected by the master cylinder pressure sensors 66. The CPU 102 further detects (calculates) the master cylinder pressure by use of the result detected by master cylinder pressure sensors 66. The CPU 102 further calculates the wheel cylinder pressures by use of the result detected by wheel cylinder pressure sensors 78. The CPU 102 further calculates the speed of each wheel 14 by use of the result detected by each wheel speed sensor 16.

The CPU 102 calculates the target wheel cylinder pressure at each wheel 14 according to the calculated amount and force of depression of the brake pedal 52, master cylinder pressure, wheel cylinder pressure, speed of wheel 14, and so on. The CPU 102 also calculates a control current to be supplied to the pressure-increasing linear valves 74 and pressure-reducing linear valves 76 according to the calculated target wheel cylinder pressures. The calculated control current is input to driving circuit 108 and driving circuit 110. Driving circuit 108 and driving circuit 110 supply an electric current to the pressure-increasing linear valves 74 and the pressure-reducing linear valves 76 according to the duty corresponding to the input control current. Pressure-increasing linear valves 74 and pressure-reducing linear valves 76 are opened and closed according to the supplied electric current, and thus increase and decrease the wheel cylinder pressure to the target wheel cylinder pressure. Accordingly, the electronically controlled brake system calculates four target wheel cylinder pressures for each of the four wheels 14, and controls the respective wheel cylinder pressure at each wheel 14 to achieve the calculated target wheel cylinder pressure. ECU 100 thus functions as a controller that drives pressure-increasing linear valves 74 and pressure-reducing linear valves 76 and controls the wheel cylinder pressures to achieve the target hydraulic pressures.

The CPU 102 further calculates the temperature of the coolant according to the result detected by the coolant temperature sensor 24. ECU 100 determines the temperature at which the vehicle is operated according to the calculated temperature of the coolant. ECU 100 further determines whether the ceiling value of the pressure change rate of the wheel cylinder pressure should be changed based upon the determined temperature. ECU 100 controls pressure-reducing linear valves 76 so that the wheel cylinder pressures are reduced at a rate that is equal to or less than the set ceiling value.

The CPU 102 further calculates an accumulator pressure by use of the result detected by accumulator pressure sensor 88. ECU 100 drives pump motor 90 by turning relay 26 on to increase the accumulator pressure, when the calculated accumulator pressure is lower than a preset pressure at which the driving of the pump starts. ECU 100 drives pump motor 90 by turning relay 26 off to decrease the accumulator pressure, when the calculated accumulator pressure is higher than a preset pressure at which the driving of the pump stops. ECU 100 thus controls the accumulator pressure so as to be within the predetermined range.

Figure 8:
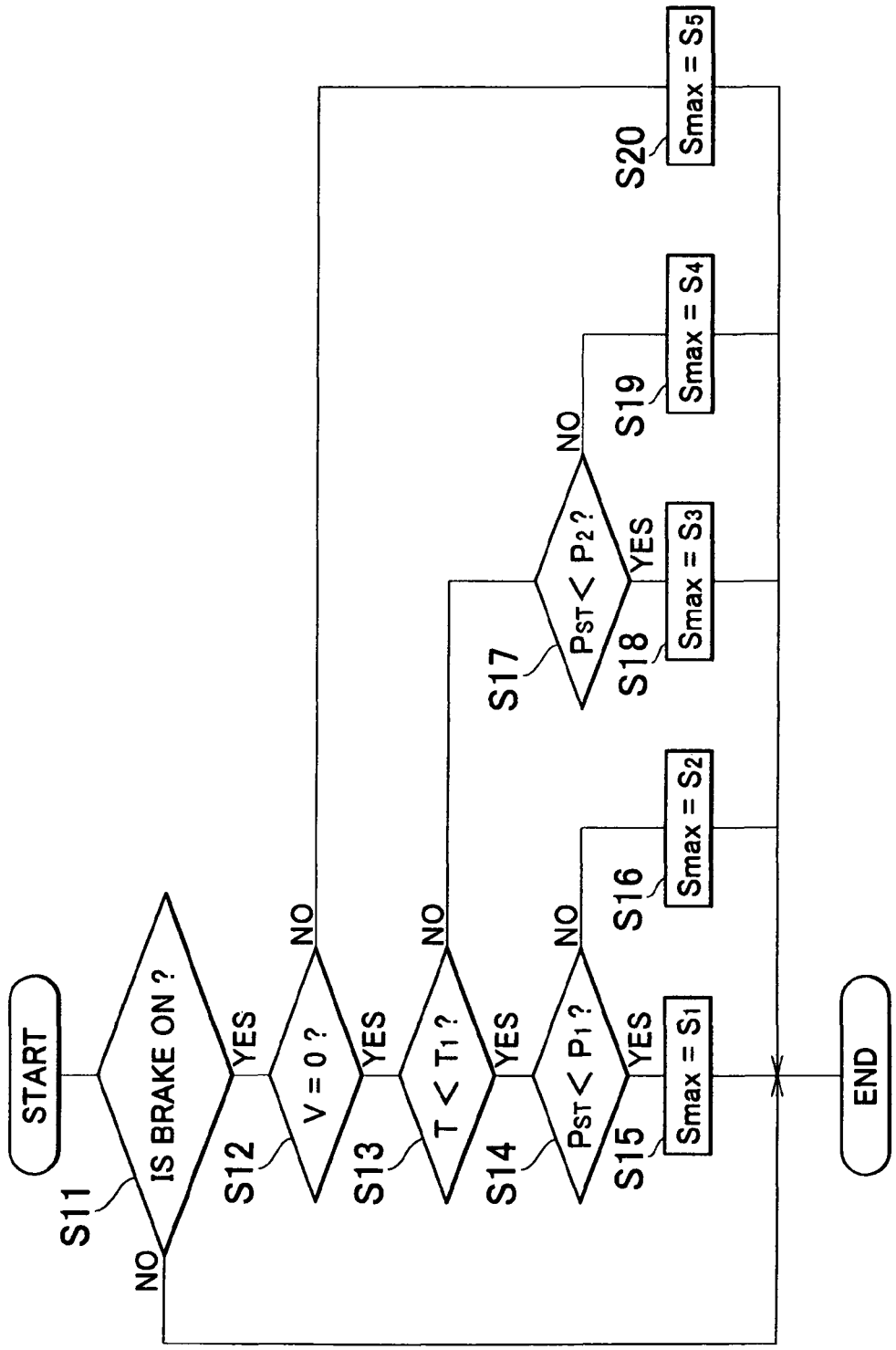
FIG. 8 is a flowchart illustrating a process for setting a ceiling value of the pressure reduction rate for reducing the wheel cylinder pressure according to the first embodiment of the present invention.

FIG. 8 is a flowchart illustrating an example of a process for setting the ceiling value of the rate (pressure reduction rate) for reducing the wheel cylinder pressure, according to the first embodiment of the present invention. The process shown in this flowchart starts when the electric power is supplied to ECU 100 after the vehicle is turned on. In this embodiment, the coolant temperature is assumed to be the same as the temperature of the hydraulic fluid in the pressure-decreasing linear valve, and accordingly both are indicated by T.

ECU 100 determines whether the brake is operated according to the result detected by stroke sensor 40 (S11). When it is determined that the brake is not operated (N in S11), the process according to this flowchart ends because the wheel cylinder pressure is already at the minimum.

If it is determined that the brake is operated (Y in S11), ECU 100 determines whether the vehicle speed V is zero according to the result detected by wheel speed sensor 16 (S12). When it is determined that the vehicle speed is not zero (N in S12), ECU 100 sets the ceiling value, Smax, of the pressure reduction rate to fifth ceiling value S5, which is larger than the pressure reduction rate SL when the valve is maximally opened (S20).

If it is determined that the vehicle speed V is zero (Y in S12), ECU 100 then determines whether the coolant temperature T is lower than the predetermined temperature T1 (S13). The temperature T1 is a threshold temperature between a low temperature and a high temperature, and may be, for example, 25° C.

If it is determined that coolant temperature T is below the temperature T1 (Y in S13), ECU 100 then determines whether the initial wheel cylinder pressure PST is lower than the first pressure P1 (S14). If it is determined that the initial wheel cylinder pressure PST is lower than the first pressure P1 (Y in S14), ECU 100 determines that self-excited vibrations are unlikely to occur, because the vehicle is in the low temperature, and also determines that self-excited vibrations are unlikely to occur, because the initial wheel cylinder pressure PST is low and the amount of reducing wheel cylinder pressure is small. Accordingly, ECU 100 determines that the self-excited vibrations are unlikely to occur in pressure-reducing linear valves 76 even if the ceiling value Smax of the pressure reduction rate is increased, and sets the ceiling value Smax of the pressure reduction rate to the first ceiling value S1, which is the largest ceiling value of the pressure reduction rate (S15).

If it is determined that the initial wheel cylinder pressure PST is equal to or higher than the first pressure P1 (N in S14), ECU 100 then determines that the ceiling value Smax of the pressure reduction rate cannot be as high as the first ceiling value S1, because, although it is unlikely that self-excited vibration will occur in pressure-reducing linear valves 76 when the vehicle is in a low temperature, the initial wheel cylinder pressure PST is high and the amount of reducing the wheel cylinder pressure is large. Accordingly, ECU 100 sets ceiling value Smax of the pressure reduction rate to the second ceiling value S2, which is a rate smaller than the first ceiling value S1 (S16).

If it is determined that the coolant temperature T is higher than the temperature T1 (N in S13), ECU 100 then determines whether the initial wheel cylinder pressure PST is lower than the second pressure P2 (S17). If it is determined that initial wheel cylinder pressure PST is lower than the second pressure P2 (Y in S17), ECU 100 then determines that the self-excited vibrations are less likely to occur compared with when the initial wheel cylinder pressure PST is higher, because while the high temperature increases the likelihood that self-excited vibrations will occur in the pressure-reducing linear valves 76, the initial wheel cylinder pressure PST is lower and the amount of reducing the wheel cylinder pressures is thus smaller. Accordingly, ECU 100 sets ceiling value Smax of the pressure reduction rate to the third ceiling value S3, which is a rate larger than the smallest ceiling value (S18).

If it is determined that initial wheel cylinder pressure PST is equal to or higher than second pressure P2 (N in S17), ECU 100 then determines that the self-excited vibrations are likely to occur in pressure-reducing linear valves 76 because the vehicle is in a high temperature, and the self-excited vibrations more likely to occur because the initial wheel cylinder pressure PST is high and the amount of reducing the wheel cylinder pressure is thus large. Accordingly, ECU 100 sets the ceiling value Smax of the pressure reduction rate to the fourth ceiling value S4, which is the smallest ceiling value (S19). The fourth ceiling value S4 may be equal to S0 shown in FIG. 3.

Figure 9:
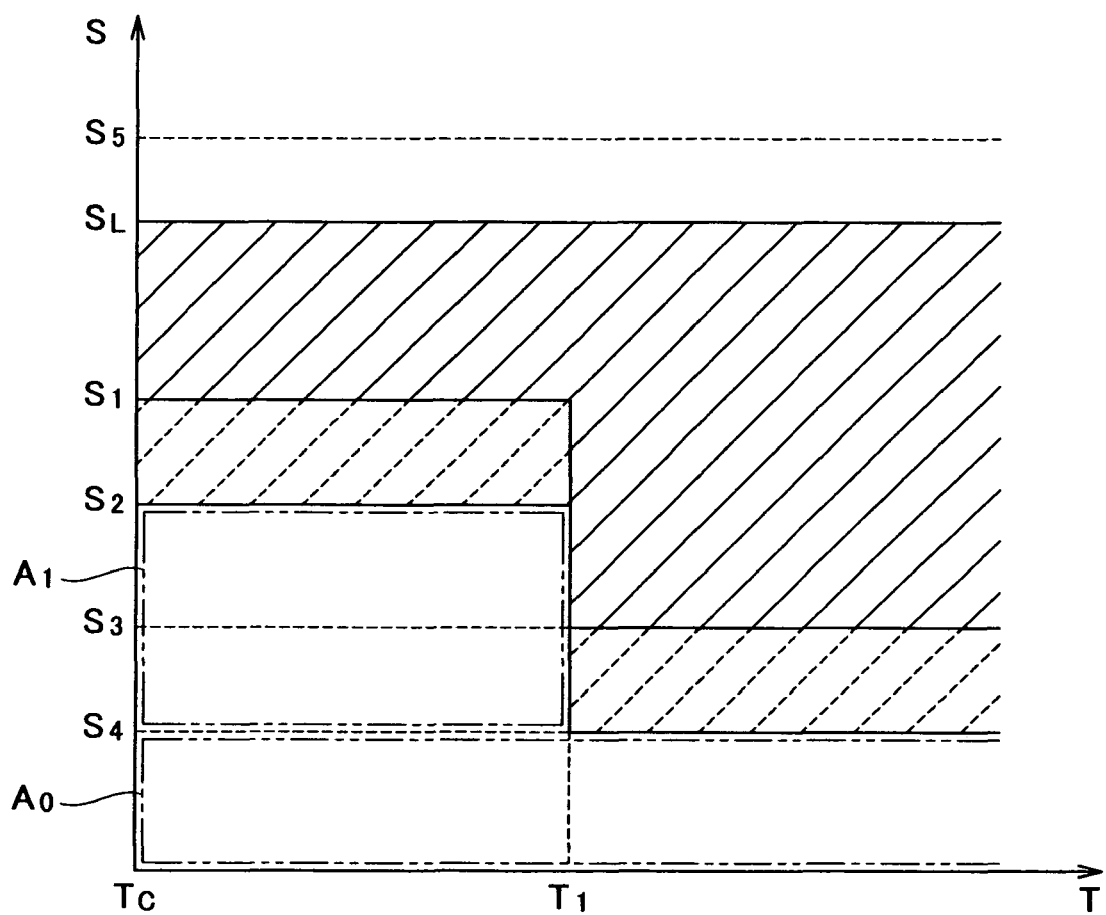
FIG. 9 is a view illustrating an example of a relationship between the temperature of the hydraulic fluid in the pressure-reducing liner valve and the pressure reduction rate of the wheel cylinder pressure, when the pressure reduction rate for reducing the wheel cylinder pressure is limited to the ceiling value, according to the first embodiment of the present invention.

FIG. 9 is a view explaining an example of a relationship between the temperature T of the hydraulic fluid in the pressure-reducing linear valves and the pressure reduction rate S for the wheel cylinder pressure in brake control apparatus 200A for the vehicle, when the pressure reduction rate for reducing the wheel cylinder pressure is limited to the ceiling value, according to the first embodiment of the present invention.

As shown in FIG. 9, when the vehicle is in a low temperature, in which the coolant temperature is below the first temperature T1, and the initial wheel cylinder pressure PST is lower than the first pressure P1, the ceiling value Smax of the pressure reduction rate is increased to the ceiling value S1. When the vehicle is in a low temperature, in which the coolant temperature is lower than the first temperature T1, and the initial wheel cylinder pressure PST is equal to or higher than the first pressure P1, the ceiling value Smax of the pressure reduction rate is increased to the second ceiling value S2. When the vehicle is in a high temperature, in which the coolant temperature is above the first temperature T1, and the initial wheel cylinder pressure PST is smaller than the second pressure P2, the ceiling value Smax of the pressure reduction rate is increased to the third ceiling value S3. When the brake is released, the ceiling value Smax of the pressure reduction rate is set to the fifth ceiling value S5, which is larger than pressure reduction rate SL. The pressure reduction rate SL is the rate when the valve is maximally opened.

Accordingly, the pressure reduction rate for reducing the wheel cylinder pressure can be changed within the range A1 and within the range hatched with broken lines, as well as within the range A0, depending upon the initial wheel cylinder pressure PST. Thus, the ceiling value Smax of the pressure reduction rate can be increased within the range A1, as compared with when, as shown in FIG. 3, the ceiling value Smax of the pressure reduction rate is set constant regardless of the temperature T of the hydraulic fluid in pressure-reducing linear valves 76. In addition, if the initial wheel cylinder pressure PST is low and the amount of reducing the wheel cylinder pressure is small, the ceiling value Smax of the pressure reduction rate can be further increased within the range hatched with the broken lines. As described above, because the ceiling value Smax of the pressure reduction rate is set according to the temperature, the ceiling value Smax of the pressure reduction rate can be increased and the wheel cylinder pressure can be reduced rapidly, while the occurrence of self-excited vibrations are suppressed.

Figure 10:
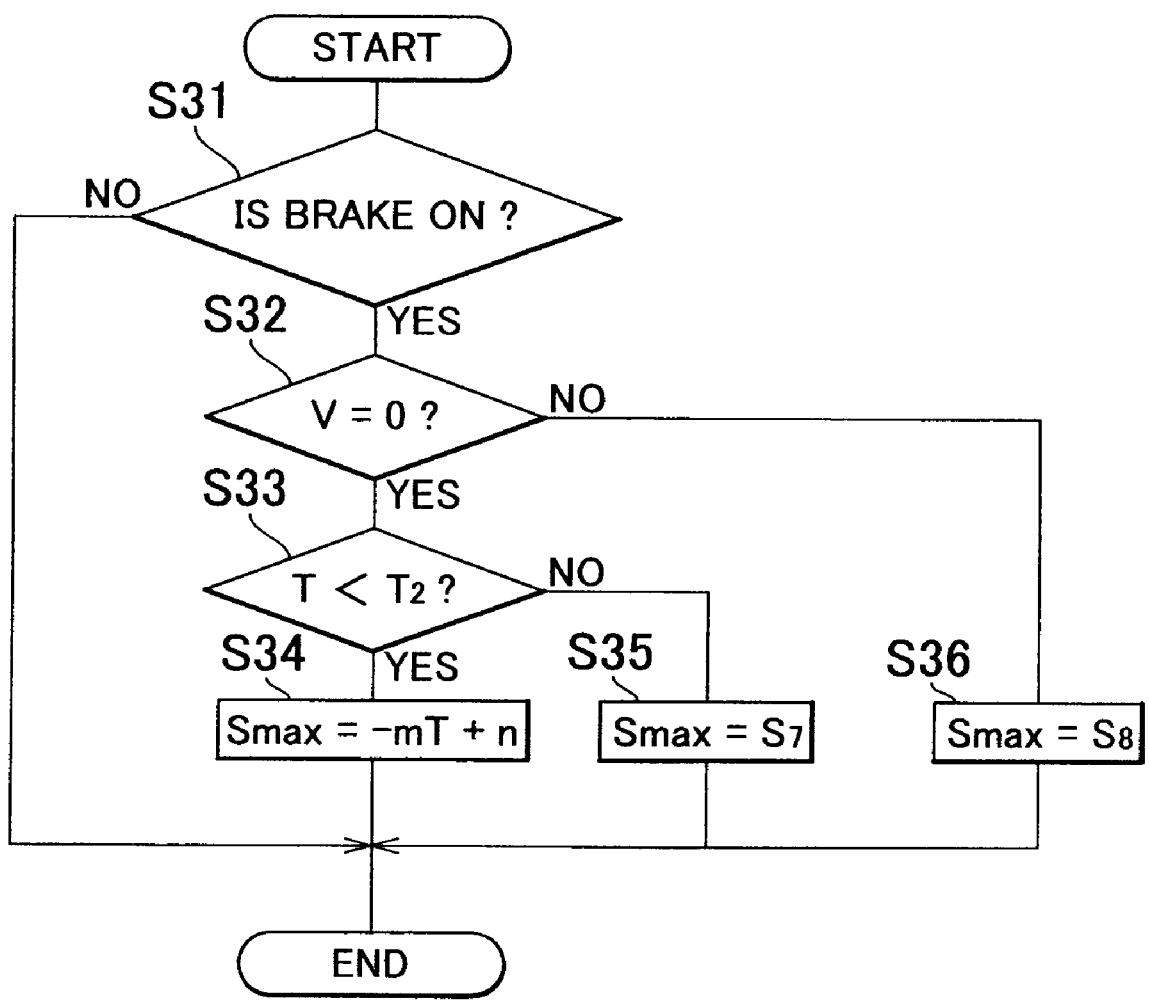
FIG. 10 is a flowchart illustrating an example of a process for setting the ceiling value of a pressure reduction rate for reducing a wheel cylinder pressure according to a second embodiment of the present invention.

FIG. 10 is a flowchart illustrating an example of a process that sets the ceiling value of the pressure reduction rate according to a second embodiment of the present invention. The process shown in FIG. 10 starts when electric power is supplied to ECU 100 after the vehicle is turned on. The explanation of parts that are similar to those in the first embodiment will be omitted. In the second embodiment, the coolant temperature is assumed to be the same as the temperature of the hydraulic fluid in the pressure-decreasing linear valve, and accordingly both are indicated by T.

ECU 100 determines whether the brake is operated according to the result detected by stroke sensor 40 (S31). If it is determined that the brake is not operated (N in S31), the process of this flowchart ends, because the wheel cylinder pressure is already at the minimum.

If it is determined that the brake is operated (Y in S31), ECU 100 then determines whether the vehicle speed V is zero in accordance with the result detected by wheel speed sensor 16 (S32). If it is determined that the vehicle speed V is not zero (N in S32), ECU 100 then sets the ceiling value Smax of the pressure reduction rate to the eighth ceiling value S8, which is larger than the pressure reduction rate SL when the valve is maximally opened (S36).

If it is determined that the vehicle speed V is zero (Y in S32), ECU 100 then determines whether the coolant temperature T is below the predetermined second temperature T2 (S33). The second temperature T2 is a threshold temperature between the low temperature and the high temperature, and may be, for example, 30° C.

If it is determined that the coolant temperature T is below the second temperature T2 (Y in S33), ECU 100 then determines that, because the temperature is low, self-excited vibration is unlikely to occur in pressure-reducing linear valves 76, even if the ceiling value Smax of the pressure reduction rate is increased, and thus sets the ceiling value Smax of the pressure reduction rate to $(-mT+n)$, where T is the coolant temperature (S34). In other words, as the temperature decreases from the second temperature T2, the ceiling value Smax of the pressure reduction rate is set to increase linearly. Thus, the ceiling value Smax of the pressure reduction rate can be linearly increased from the second temperature T2. In other words, the ceiling value Smax of the pressure reduction rate can be set as the maximum value in which the self-excited vibrations do not occur in each temperature.

In this embodiment, as the coolant temperature T changes from the second temperature T2 to Tc, the ceiling value Smax of the pressure reduction rate linearly changes from S7 to S6. Accordingly, m represents $(S6-S7)/(T2-Tc)$, and n represents $(S6*T2-S7*Tc)/(T2-Tc)$. If the coolant temperature T is below the second temperature Tc, the ceiling value Smax of the pressure change rate is set constant to be sixth ceiling value S6.

If it is determined that the coolant temperature T is equal to or higher than the second temperature T2 (N in S33), ECU 100 then determines that self-excited vibrations are likely to occur in pressure-reducing linear valves 76 if ceiling value Smax of the pressure reduction rate is increased, because the vehicle is in the high temperature. Accordingly, the ceiling value Smax of the pressure reduction rate is set to the seventh ceiling value S7, which is the smallest ceiling value (S35). The ceiling value S7 can be the same value as S0 shown in FIG. 3.

Figure 11:
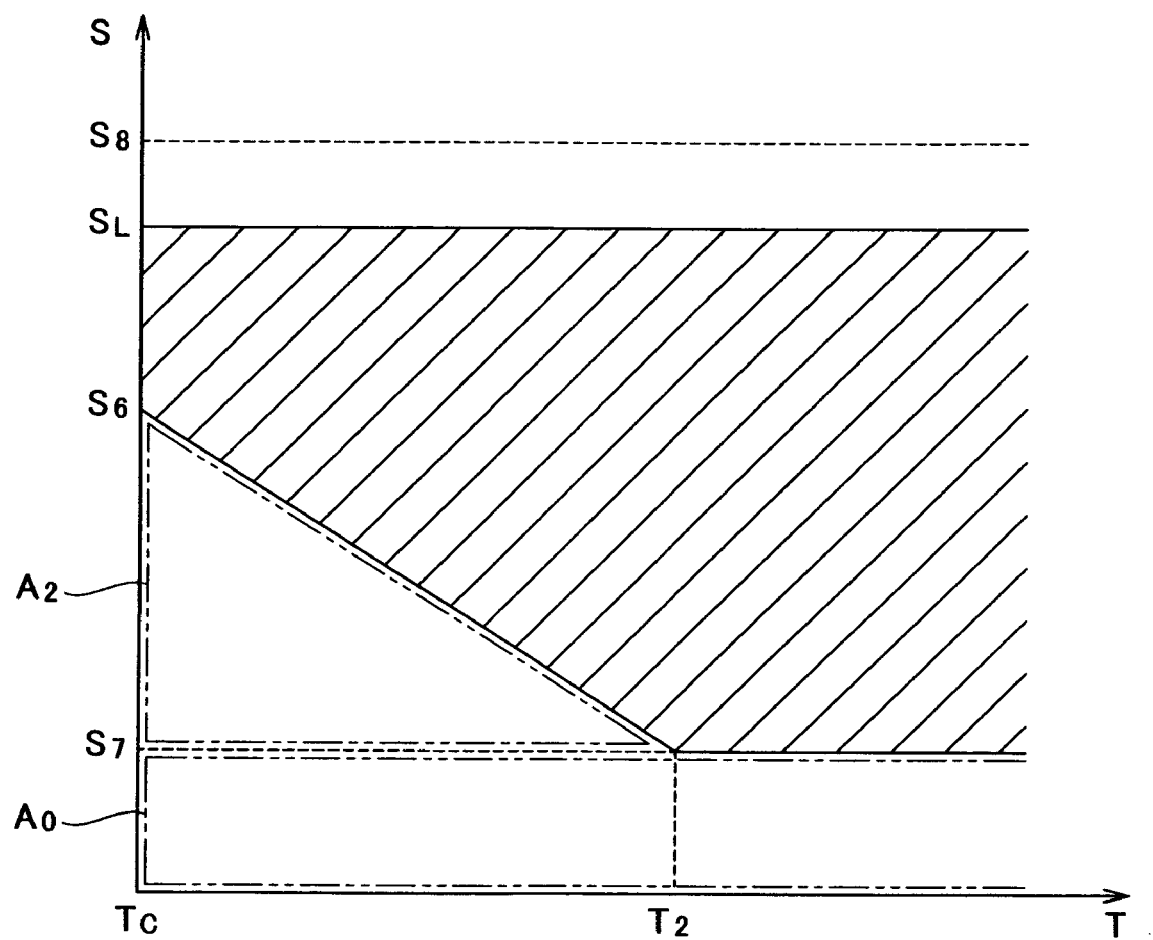
FIG. 11 is a view illustrating an example of a relationship between the temperature of a hydraulic fluid in a pressure-reducing liner valve and the pressure change (reduction) rate for reducing a wheel cylinder pressure, when the pressure reduction rate of the wheel cylinder pressure is limited to the ceiling value, according to the second embodiment of the present invention.

FIG. 11 is a view illustrating an example of a relationship between the temperature T of the hydraulic fluid in the pressure-reducing linear valves and the pressure reduction rate for reducing the wheel cylinder pressures, when the pressure reduction rate of the wheel cylinder pressure is limited to the ceiling value, in the brake control apparatus 200A for the vehicle according to the second embodiment of the present invention.

As shown in FIG. 11, when the vehicle is in the low temperature, in which the coolant temperature is below the second temperature T2, the ceiling value Smax of the pressure reduction rate is gradually increased as the temperature decreases from the second temperature T2.

Accordingly, in addition to the range A0, the pressure reduction rate for reducing the wheel cylinder pressures can be changed in the range A2. Therefore, the ceiling value Smax of the pressure reduction rate can be increased within the range A2, compared with when the ceiling value Smax of the pressure reduction rate is set constant regardless of the temperature T of the hydraulic fluid in the pressure-reducing linear valves 76. Because the ceiling value Smax of the pressure reduction rate is set according to the temperature, the ceiling value Smax of the pressure reduction rate can be increased and the wheel cylinder pressures can be rapidly reduced, while the occurrence of self-excited vibrations are suppressed in the pressure-reducing linear valves 76.

Figure 12:
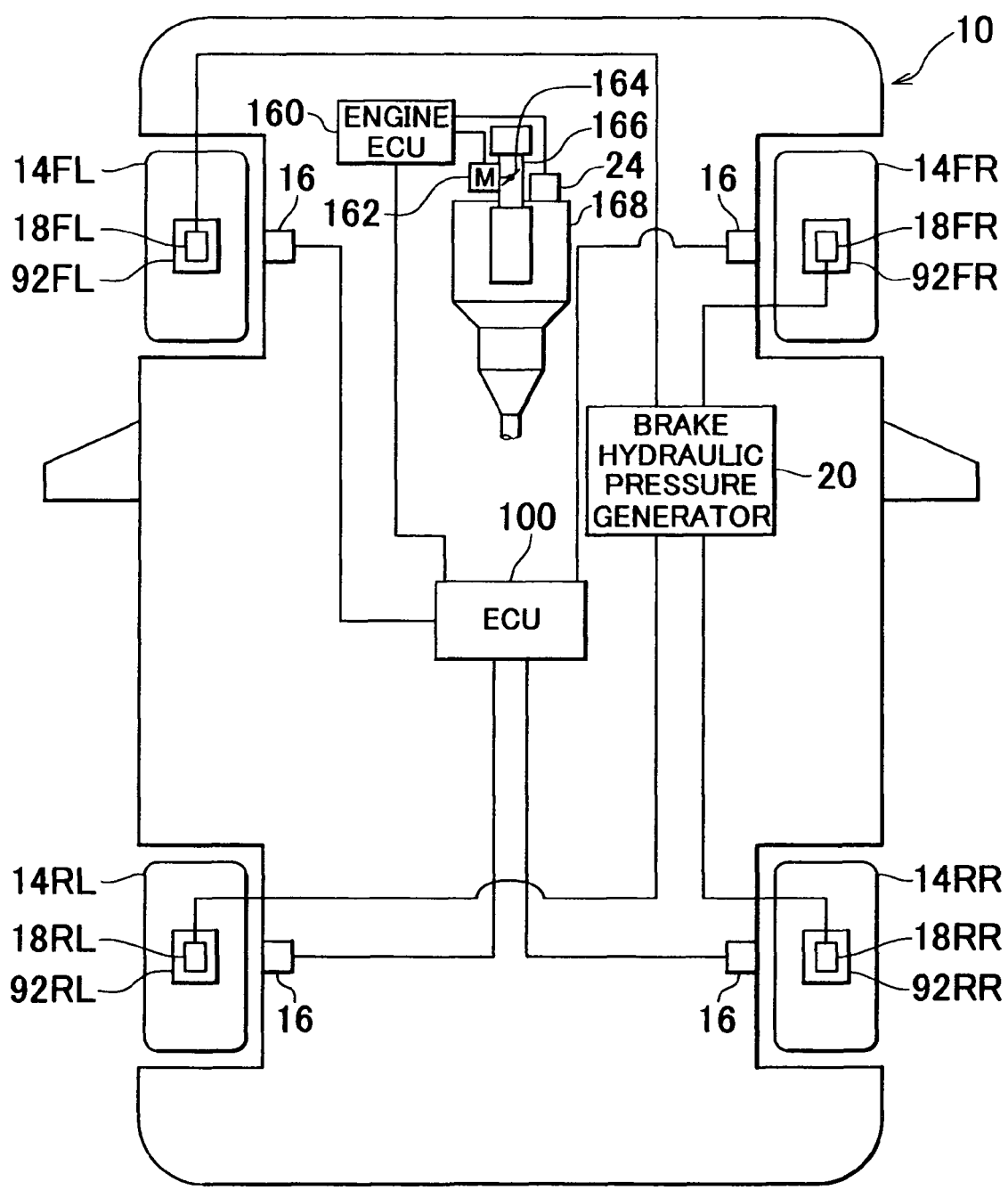
FIG. 12 is a view illustrating an entire configuration of a brake control apparatus according to a third embodiment of the present invention.

FIG. 12 is a schematic view illustrating an entire configuration of a brake control apparatus 200B for a vehicle according to a third embodiment of the present invention. The brake control apparatus 200B includes ECU 100, engine ECU 160, engine 168, hydraulic brake system 150, which is similar to that explained in the previous embodiments, or the like, on vehicle 10. Hydraulic brake system 150 includes brake hydraulic pressure generator 20. ECU 100 of this embodiment functions as a brake ECU that controls the hydraulic brake system. In this embodiment, the vehicle 10 is equipped with an automatic transmission (not shown). The explanation of parts similar to those of the previous embodiments will be omitted.

The engine 168 includes intake path 166. The intake path 166 includes throttle valve 164 in the interior of the intake path 166. The throttle valve 164 is connected with throttle motor 162, and is driven by throttle motor 162. The throttle motor 162 is connected with engine ECU 160. The engine ECU 160 drives throttle motor 162 to adjust the valve opening of throttle valve 164 by outputting a driving signal to throttle motor 162 and thus controls the amount of air supplied into the interior of engine 168.

Coolant temperature sensor 24 detects the temperature of the coolant that cools engine 168 and is provided in the vicinity of engine 168. Coolant temperature sensor 24 is connected with engine ECU 160 and the result detected by coolant temperature sensor 24 is input to engine ECU 160. Engine ECU 160 determines the temperature at which the vehicle is operated according to the result detected by the coolant temperature sensor 24. Engine ECU outputs a driving signal to throttle motor 162 according to the determined temperature, and thus changes the amount of air supplied to the interior of engine 168 in order to change the idling engine speed. Engine ECU controls engine 168, for example, to decrease the idling engine speed as the vehicle is in the higher temperature. In the meantime, engine ECU controls engine 168 to increase the idling engine speed as the vehicle is in the lower temperature. In other words, engine ECU 160 functions as a controller that controls the idling engine speed.

Engine ECU 160 is connected with ECU 100. Engine ECU 160 inputs the information indicating the idling engine speed to ECU 100. ECU 100 determines the temperature according to the input information indicating the idling engine speed. For example, if the idling speed is higher than a predetermined value, ECU 100 determines that the vehicle is in the low temperature. ECU 100 can thus determines the temperature by use of the idling engine speed control by engine ECU 160.

The process determining the ceiling value of the pressure reduction rate for reducing the wheel cylinder pressures in this embodiment may be the same as that of the first embodiment, except that it is determined in S13 shown in FIG. 8, for example, whether the idling speed is higher than a predetermined value. Alternatively, the process may be the same as that of the second embodiment, except that it is determined in FIG. 10, for example, whether the idling speed is above a predetermined value in S33 and defines a function in which the ceiling value Smax is changed linearly with respect to the changes in the idling engine speed in S34.

It is to be understood that the invention is not limited to the above-described embodiments, but may be embodied with combinations of elements of the embodiments. The embodiments may incorporate various changes, modifications, or improvements, such as design changes, which may occur to those skilled in the art. These modified, changed or improved embodiments are also within the scope of the present invention. Such examples will be explained hereinafter.

For example, ECU 100 may determine the temperature according to the result detected by an ambient temperature sensor. The ambient temperature sensor may be provided in or in the vicinity of the engine compartment, and may be, for example, a sensor used for controlling the temperature of an air conditioner or displaying an ambient temperature in the passenger compartment. The ECU 100 may determine the temperature according thereto.

ECU 100 may set the ceiling value of the rate for increasing the wheel cylinder pressures according to the temperature, and may increase the wheel cylinder pressures at a rate equal to or smaller than the set ceiling value. Thus, the brake can be swiftly driven at the pressure change rate increased to one that is appropriate for the temperature, while the occurrence of the self-excited vibrations in the pressure-increasing linear valve are suppressed.

Vehicle 10 may be equipped with a manual transmission. In such a case, while the occurrence of self-excited vibrations in pressure-reducing linear valves 76 are suppressed while the wheel cylinder pressures are reduced, a vehicle operator is prevented from feeling uncomfortable due to, for example, the lag in responding to the release of the brakes.

What is claimed is:
1. A brake control apparatus, comprising:
an actuator that changes a wheel cylinder pressure; and
a controller that controls the wheel cylinder pressure to a target hydraulic pressure by driving the actuator in response to a braking request, the controller setting a ceiling maximum value of a pressure change rate,
wherein the pressure change rate indicates a change in the wheel cylinder pressure per unit time, in accordance with a temperature, and the controller changes the wheel cylinder pressure at a pressure change rate that is equal to or lower than the ceiling maximum value to reduce self-excited vibrations, wherein the controller increases the ceiling maximum value as the temperature decreases, and wherein the controller decreases the wheel cylinder pressure at a pressure change rate that is equal to or lower than the ceiling maximum value, and when an initial wheel cylinder pressure at a beginning of a pressure decrease is equal to or greater than a predetermined pressure, the controller sets the ceiling maximum value of the pressure change rate smaller than when the initial wheel cylinder pressure at the beginning of the pressure decrease is smaller than the predetermined pressure.

2. The brake control apparatus according to claim 1, wherein the controller changes the wheel cylinder pressure at a pressure change rate that is equal to or lower than the ceiling maximum value, while the vehicle is stopped.

3. The brake control apparatus according to claim 1, wherein the controller determines the temperature in accordance with a temperature of a coolant that cools an engine.

4. The brake control apparatus according to claim 1, wherein the controller determines the temperature in accordance with an ambient temperature in a vicinity of an engine of the vehicle.

5. The brake control apparatus according to claim 1, wherein the controller determines the temperature in accordance with an idling engine speed of the vehicle.

6. The brake control apparatus according to claim 1, wherein the controller compares an initial wheel cylinder pressure with a predetermined pressure, and wherein
the controller increases the ceiling maximum value if the initial wheel cylinder pressure is below the predetermined pressure.

7. The brake control apparatus according to claim 1, wherein the controller increases the ceiling maximum value linearly as the temperature decreases.

8. A brake control method for a vehicle, comprising:
determining a temperature;
setting a ceiling maximum value of a pressure change rate, which indicates a change in a wheel cylinder pressure per unit time, in accordance with the temperature; and
changing the wheel cylinder pressure at a pressure change rate that is equal to or lower than the ceiling maximum value to reduce self-excited vibrations, wherein the ceiling maximum value is increased as the temperature decreases, and wherein the wheel cylinder pressure is decreased at a pressure change rate that is equal to or lower than the ceiling maximum value, and when an initial wheel cylinder pressure at a beginning of a pressure decrease is equal to or greater than a predetermined pressure, the ceiling maximum value of the pressure change rate is set smaller than when the initial wheel cylinder pressure at the beginning of the pressure decrease is smaller than the predetermined pressure.

9. The brake control method according to claim 8, wherein the wheel cylinder pressure is changed at a pressure change rate that is equal to or lower than the ceiling maximum value, while the vehicle is stopped.

10. The brake control method according to claim 8, wherein the temperature is determined in accordance with a temperature of a coolant that cools an engine.

11. The brake control method according to claim 8, wherein the temperature is determined in accordance with an ambient temperature in a vicinity of an engine of the vehicle.

12. The brake control method according to claim 8, wherein the temperature is determined in accordance with an engine idle speed.

13. The brake control method according to claim 8, further comprising:
comparing an initial wheel cylinder pressure with a predetermined pressure; and
increasing the ceiling maximum value if the initial wheel cylinder pressure is below the predetermined value.

14. The brake control method according to claim 8, wherein the ceiling maximum value is increased linearly as the temperature decreases.

* * * * *